(12) United States Patent
Geirhofer et al.

(10) Patent No.: US 9,198,071 B2
(45) Date of Patent: Nov. 24, 2015

(54) CHANNEL STATE INFORMATION REFERENCE SIGNAL CONFIGURING AND REPORTING FOR A COORDINATED MULTI-POINT TRANSMISSION SCHEME

(71) Applicant: QUALCOMM Incorporated, San Diego, CA (US)

(72) Inventors: Stefan Geirhofer, San Diego, CA (US); Wanshi Chen, San Diego, CA (US); Hao Xu, San Diego, CA (US); Peter Gaal, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 142 days.

(21) Appl. No.: 13/787,454

(22) Filed: Mar. 6, 2013

(65) Prior Publication Data

US 2013/0242778 A1    Sep. 19, 2013

Related U.S. Application Data

(60) Provisional application No. 61/612,944, filed on Mar. 19, 2012, provisional application No. 61/659,923, filed on Jun. 14, 2012.

(51) Int. Cl.
*H04W 24/10* (2009.01)
*H04L 1/00* (2006.01)
(Continued)

(52) U.S. Cl.
CPC ............. *H04W 24/10* (2013.01); *H04L 1/0026* (2013.01); *H04L 1/0027* (2013.01);
(Continued)

(58) Field of Classification Search
CPC . H04L 12/407; H04L 12/413; H04L 27/2611; H04W 16/24; H04W 16/32; H04W 40/32; H04W 56/001–56/004; H04W 56/0015; H04W 74/08; H04W 74/088; H04W 74/0816; H04W 72/04; H04W 72/12; H04W 28/0205

USPC ................ 370/252, 310, 328–330, 338–339; 455/443–444, 446, 448–450, 452.2, 455/464, 509, 524–525
See application file for complete search history.

(56) References Cited

U.S. PATENT DOCUMENTS 8,077,667 B2 * 12/2011 Kuri et al. ..................... 370/329
2005/0143081 A1 * 6/2005 Stephens ....................... 455/451
(Continued)

FOREIGN PATENT DOCUMENTS

| DE | 102008013349 A1 * | 9/2009 |
| WO | 2011100672 A1 | 8/2011 |
| WO | 2011115421 A2 | 9/2011 |

OTHER PUBLICATIONS

Huawei et al: "CSI-RS configuration and signalling", 3GPP Draft; R1-112902, CSI-RS Configuration and Signaling, 3rd Generation Partnership Project (3GPP), Mobile Competence Centre; 658, Route Des Lucioles ; F-06921, Sophia-Antipolis Cedex; France, vol. RAN WG1, No. Zhuhai; 20111010, Oct. 4, 2011 (2011-18-04), XP050538114.

(Continued)

*Primary Examiner* — Charles C Jiang
*Assistant Examiner* — Mohamed Kamara
(74) *Attorney, Agent, or Firm* — Seyfarth Shaw LLP

(57) ABSTRACT

A method for wireless communication includes allocating overlapping sets of resources to different UEs. The resources may be for channel state information (CSI) measurement and received power measurements. The overlapping resources include a first set of resources, allocated to a first UE, for the CSI measurements and a second set of resources, allocated to a second UE, for the received power measurements. The method also includes receiving a CSI measurement report and a received power measurement report. The reports are based on the first set of resources and the second set or resources, respectively.

23 Claims, 16 Drawing Sheets

(51) Int. Cl.
*H04L 5/00* (2006.01)
*H04L 25/02* (2006.01)
*H04B 17/24* (2015.01)
*H04B 17/309* (2015.01)
*H04B 17/318* (2015.01)

(52) U.S. Cl.
CPC ........... *H04L 1/0029* (2013.01); *H04L 5/0051* (2013.01); *H04L 5/0057* (2013.01); *H04B 17/24* (2015.01); *H04B 17/309* (2015.01); *H04B 17/318* (2015.01); *H04L 5/0094* (2013.01); *H04L 25/0204* (2013.01)

(56) References Cited

U.S. PATENT DOCUMENTS

| | | | |
|---|---|---|---|
| 2008/0056181 A1* | 3/2008 | Imamura et al. | 370/329 |
| 2010/0246527 A1* | 9/2010 | Montojo et al. | 370/330 |
| 2011/0077020 A1* | 3/2011 | Zangi | 455/453 |
| 2011/0170435 A1* | 7/2011 | Kim et al. | 370/252 |
| 2011/0176498 A1* | 7/2011 | Montojo et al. | 370/329 |
| 2011/0269459 A1* | 11/2011 | Koo et al. | 455/434 |
| 2012/0039268 A1* | 2/2012 | Hakkinen et al. | 370/329 |
| 2012/0127869 A1* | 5/2012 | Yin et al. | 370/252 |
| 2012/0188955 A1 | 7/2012 | Zhang | |
| 2012/0220327 A1 | 8/2012 | Lee et al. | |
| 2012/0230271 A1 | 9/2012 | Kim et al. | |
| 2012/0236741 A1 | 9/2012 | Xu et al. | |
| 2012/0257515 A1 | 10/2012 | Hugl et al. | |
| 2013/0250864 A1* | 9/2013 | Zhang et al. | 370/329 |
| 2014/0079017 A1* | 3/2014 | Womack et al. | 370/330 |
| 2014/0126524 A1* | 5/2014 | Yin et al. | 370/329 |

OTHER PUBLICATIONS

Huawei et al., "Management of CoMP Measurement Set", 3GPP Draft; R1-120033, 3rd Generation Partnership Project {3GPP), Mobile Competence Centre; 650, Route Des Lucioles ; F-06921 Sophia-Antipolis Cedex; France, vol. RAN WG1, No. Dresden, Germany; 20120206-20120210, XP050562620, [retrieved on Jan. 31, 2012] the whole document.
International Search Report and Written Opinion—PCT/US2013/029697—ISA/EPO—Aug. 21, 2013.
Partial International Search Report—PCT/US2013/029697—ISA/EPO—May 27, 2013.

* cited by examiner

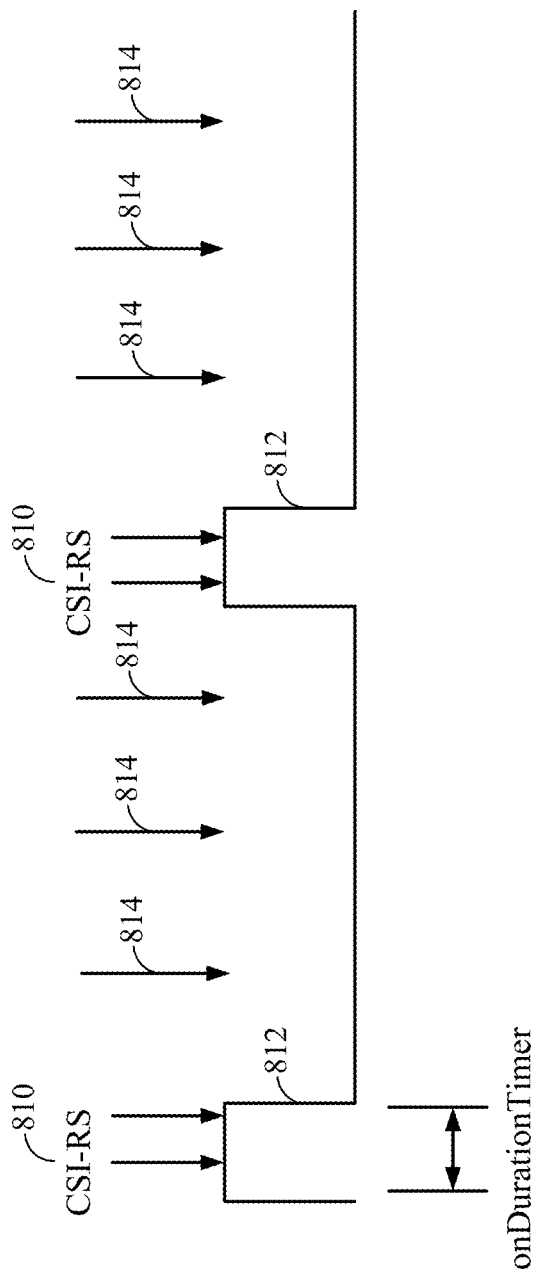

CHANNEL STATE INFORMATION REFERENCE SIGNAL CONFIGURING AND REPORTING FOR A COORDINATED MULTI-POINT TRANSMISSION SCHEME

CROSS-REFERENCE TO RELATED APPLICATION

This application claims the benefit under 35 U.S.C. §119(e) to U.S. Provisional Patent Application No. 61/612,944 entitled "CHANNEL STATE INFORMATION REFERENCE SIGNAL CONFIGURATION AND REPORTING FOR COORDINATED MULTIPOINT TRANSMISSION SCHEMES," filed on Mar. 19, 2012, and U.S. Provisional Patent Application No. 61/659,923 entitled "CHANNEL STATE INFORMATION REFERENCE SIGNAL CONFIGURATION AND REPORTING FOR COORDINATED MULTIPOINT TRANSMISSION SCHEMES," filed on Jun. 14, 2012, the disclosures of which are expressly incorporated by reference herein in their entirety.

BACKGROUND

1. Field

Aspects of the present disclosure relate generally to wireless communication systems, and more particularly to controlling relay station activity states.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

SUMMARY

An aspect of the present disclosure is directed to reducing overhead by allocating overlapping sets of resources to different UEs. The resources may be for channel measurements (such as channel state information (CSI) feedback) and received power measurements (such as reference signal received power (RSRP) measurements). The overlapping resources may include a first set of resources for channel measurements and a second set of resources for received power measurements. The first set of resources may be allocated to a first UE and the second set of resources may be allocated to a second UE. The present aspect of the disclosure further includes receiving the CSI measurement report and the received power measurement report based on the first set of resources and the second set or resources, respectively.

In one configuration, a method of wireless communication is disclosed. The method includes allocating overlapping sets of resources to different UEs. The method also includes receiving a channel measurement report based at least in part on the first set of resources. The method further includes receiving a received power measurement report based at least in part on the second set of resources.

In another configuration, a method of wireless communication is disclosed. The method includes receiving grouped channel state information reference signal (CSI-RS) in bursts, the burst having a first periodicity. The method may also include receiving one or more non-grouped CSI-RS with a second periodicity.

Another configuration discloses an apparatus including means for allocating overlapping sets of resources to different UEs. The apparatus also includes means for receiving a channel measurement report based at least in part on the first set of resources. The apparatus further includes means for receiving a received power measurement report based at least in part on the second set of resources.

In another configuration, an apparatus of wireless communication is disclosed. The apparatus includes means for receiving grouped CSI-RS in bursts, the burst having a first periodicity. The apparatus may also include means for receiving one or more non-grouped CSI-RS with a second periodicity.

In yet another configuration, a computer program product for wireless communications in a wireless network having a non-transitory computer-readable medium is disclosed. The computer readable medium has non-transitory program code recorded thereon which, when executed by a processor(s), causes the processor(s) to allocate overlapping sets of resources to different UEs. The program code also causes the processor(s) to receive a channel measurement report based at least in part on the first set of resources. The program code further causes the processor(s) to receive a received power measurement report based at least in part on the second set of resources.

In still yet another configuration, a computer program product for wireless communications in a wireless network having a non-transitory computer-readable medium is disclosed. The computer readable medium has non-transitory program code recorded thereon which, when executed by the processor(s), causes the processor(s) to grouped CSI-RS in bursts, the burst having a first periodicity. The program code may also causes the processor(s) to receive one or more non-grouped CSI-RS with a second periodicity.

Another configuration discloses wireless communication having a memory and at least one processor coupled to the memory. The processor(s) is configured to allocate overlapping sets of resources to different UEs. The processor(s) is also configured to receive a channel measurement report based at least in part on the first set of resources. The processor(s) is further configured to receive a received power measurement report based at least in part on the second set of resources.

Yet another configuration discloses wireless communication having a memory and at least one processor coupled to the memory. The processor(s) is configured to receive a grouped CSI-RS in bursts, the burst having a first periodicity. The processor(s) may also be further configured to receive non-grouped CSI-RS having a second periodicity.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

FIGS. 8A-8C are diagrams illustrating timing of channel state information reference signals for discontinuous reception schemes according to aspects of the present disclosure.

DETAILED DESCRIPTION

Figure 1:
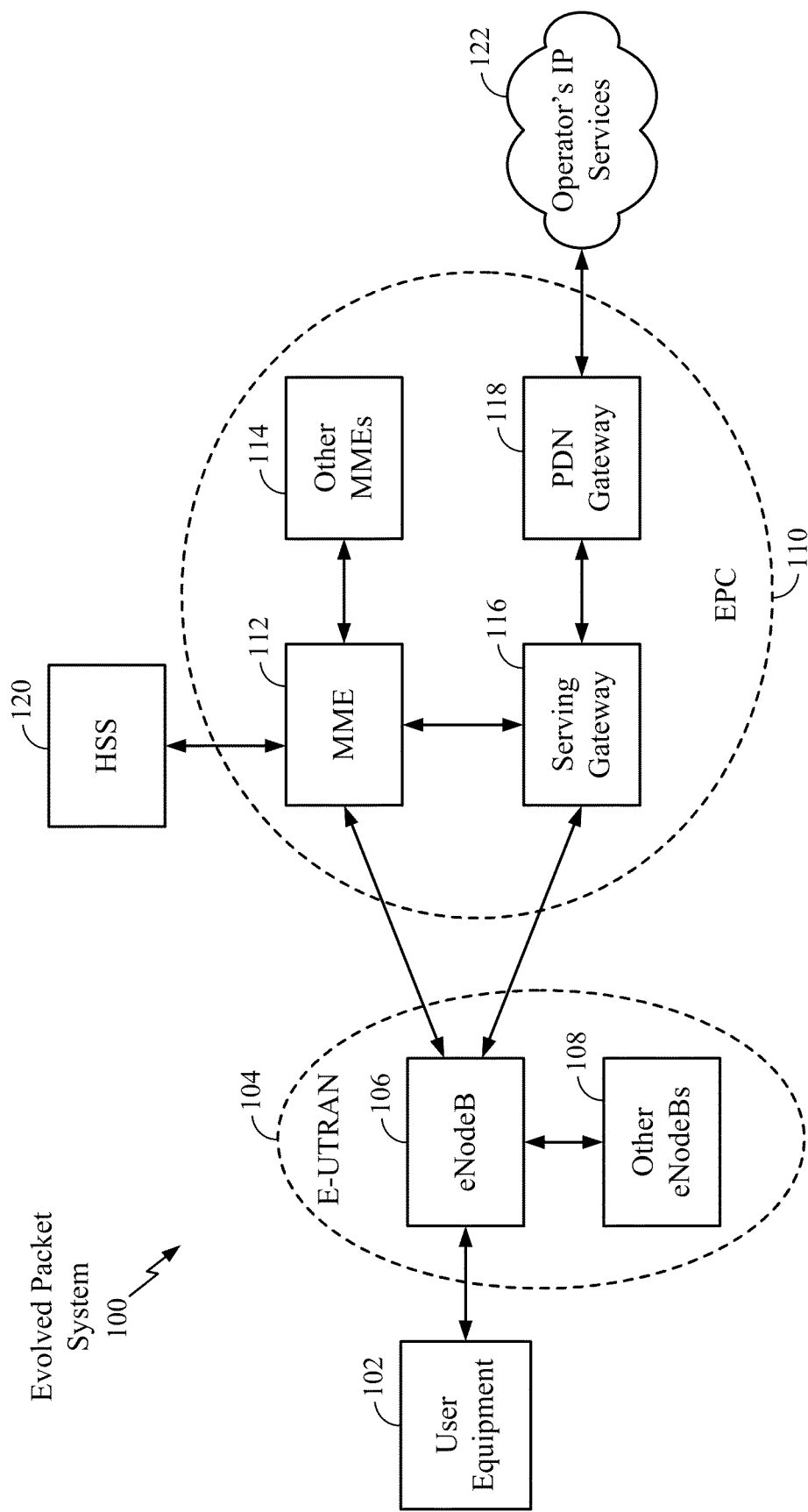
FIG. 1 is a diagram illustrating an example of a network architecture.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Aspects of the telecommunication systems are presented with reference to various apparatus and methods. These apparatus and methods are described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNodeB) 106 and other eNodeBs 108. The eNodeB 106 provides user and control plane protocol terminations toward the UE 102. The eNodeB 106 may be connected to the other eNodeBs 108 via a backhaul (e.g., an X2 interface). The eNodeB 106 may also be referred to as a base station, a base transceiver station, a radio base station, a radio transceiver, a transceiver function, a basic service set (BSS), an extended service set (ESS), or some other suitable terminology. The eNodeB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNodeB 106 is connected to the EPC 110 via, e.g., an S1 interface. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
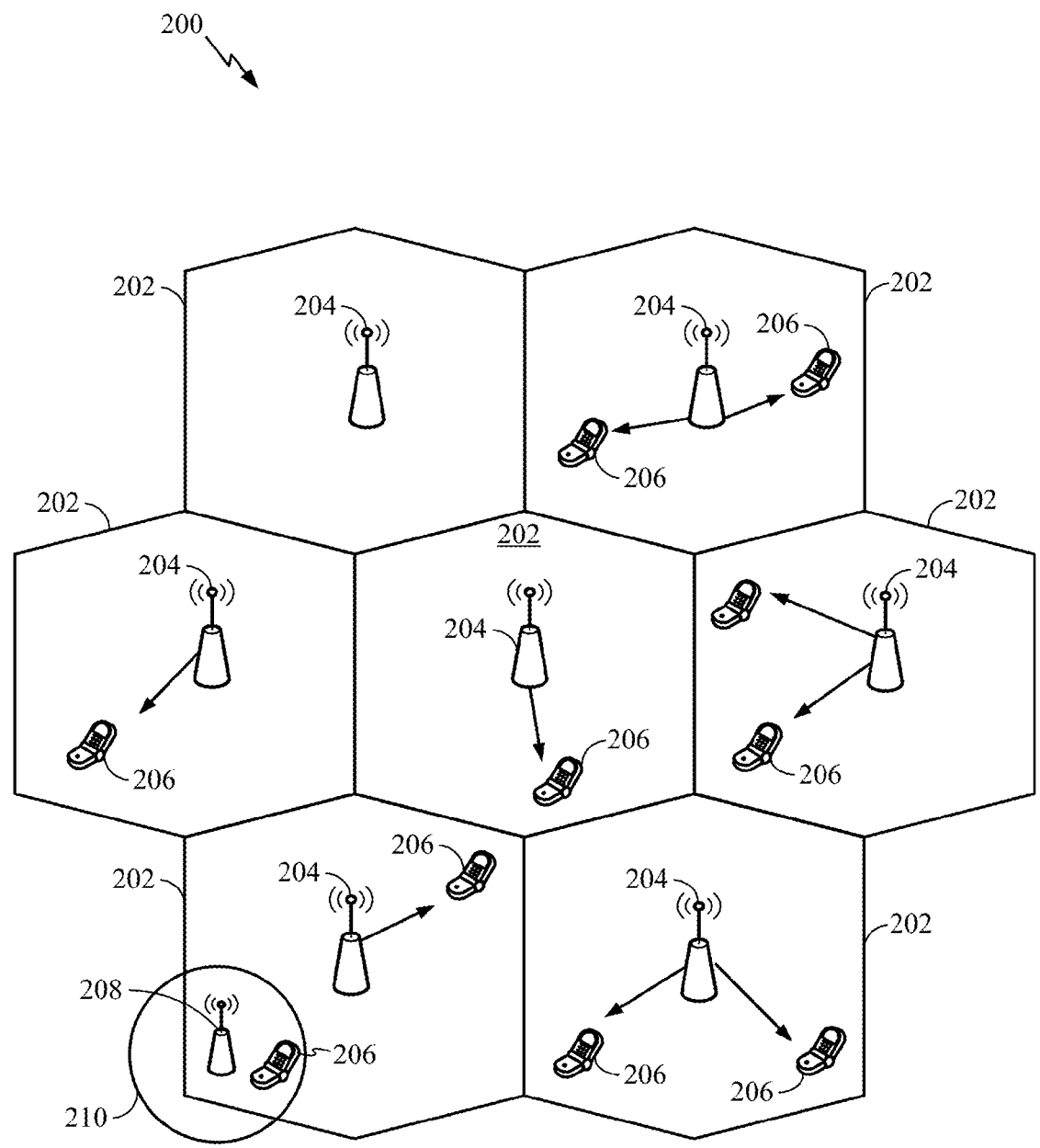
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNodeBs 208 may have cellular regions 210 that overlap with one or more of the cells 202. A lower power class eNodeB 208 may be a remote radio head (RRH), a femto cell (e.g., home eNodeB (HeNB)), a pico cell, or a micro cell. The macro eNodeBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNodeBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the downlink and SC-FDMA is used on the uplink to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNodeBs 204 may have multiple antennas supporting MIMO technology. The use of MIMO technology enables the eNodeBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the downlink. The spatially precoded data streams arrive at the UE(s) 206 with different spatial signatures, which enables each of the UE(s) 206 to recover the one or more data streams destined for that UE 206. On the uplink, each UE 206 transmits a spatially precoded data stream, which enables the eNodeB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PAPR).

Figure 3:
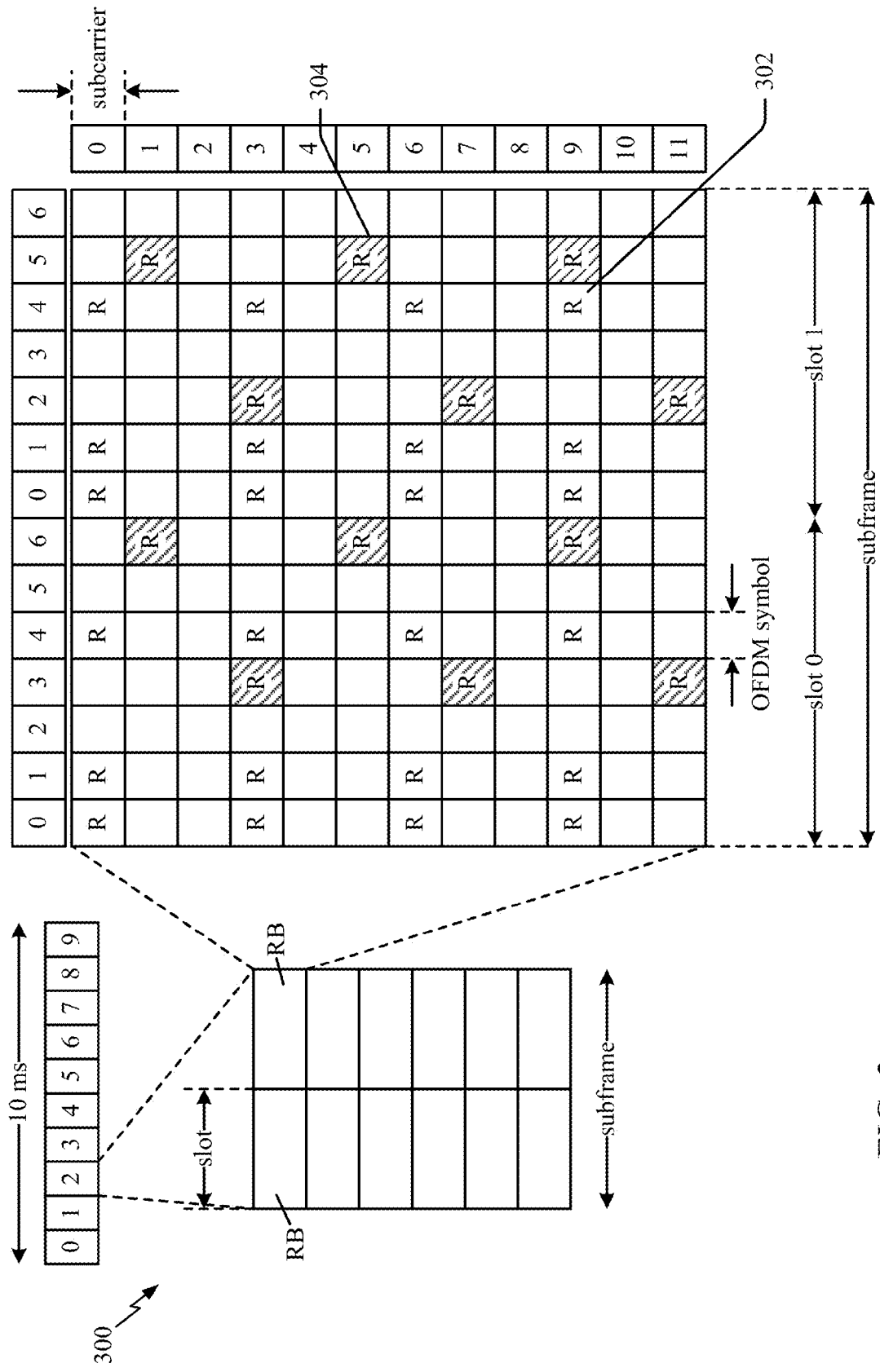
FIG. 3 is a diagram illustrating an example of a downlink frame structure in LTE.

FIG. 3 is a diagram 300 illustrating an example of a downlink frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include downlink reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical downlink shared channel (PDSCH) is mapped. The number of bits carried by each resource element depends on the modulation scheme. Thus, the more resource blocks that a UE receives and the higher the modulation scheme, the higher the data rate for the UE.

Figure 4:
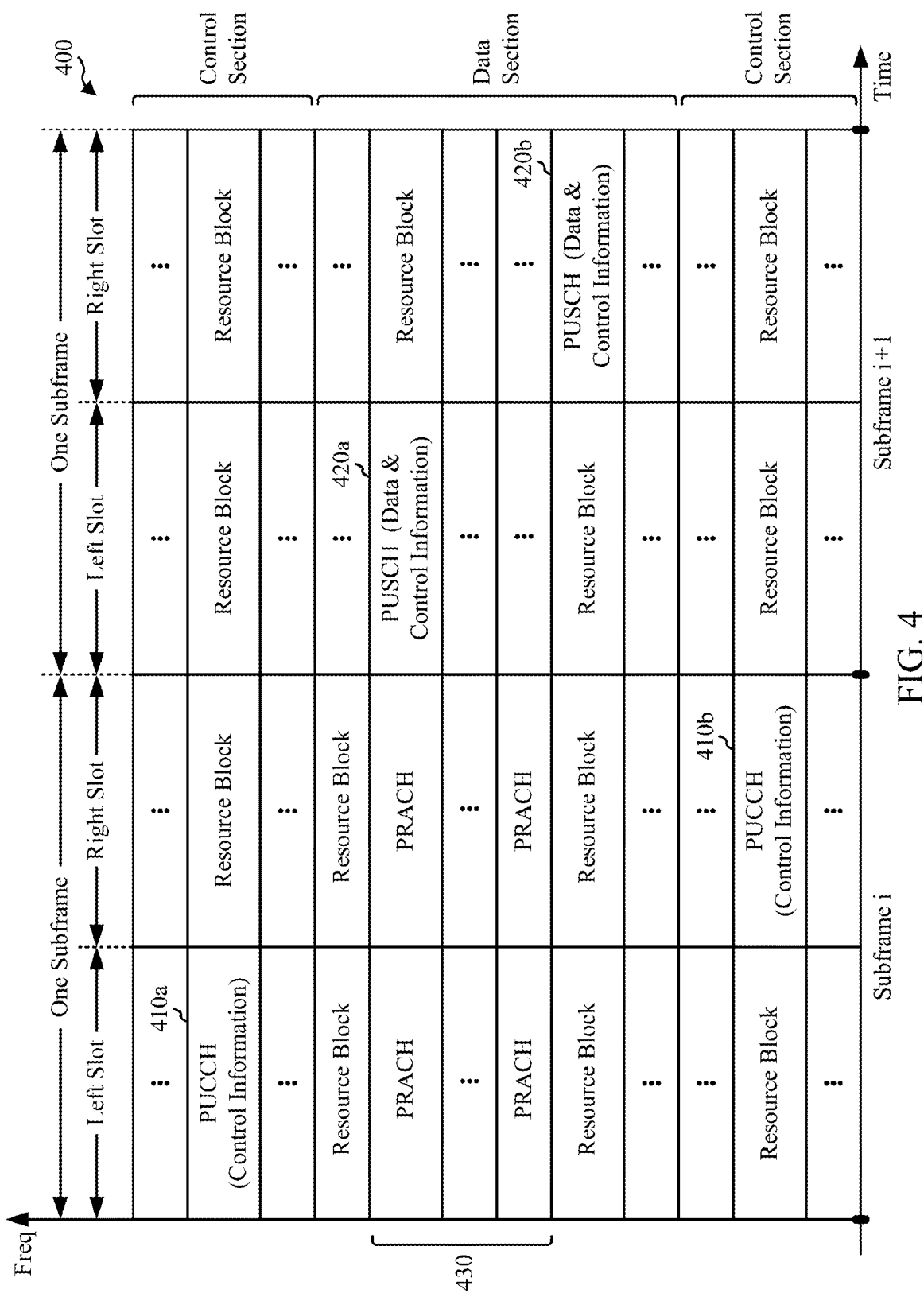
FIG. 4 is a diagram illustrating an example of an uplink frame structure in LTE.

FIG. 4 is a diagram 400 illustrating an example of an uplink frame structure in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The uplink frame structure results in the data section including contiguous subcarriers, which may allow a single UE to be assigned all of the contiguous subcarriers in the data section.

A UE may be assigned resource blocks 410*a*, 410*b* in the control section to transmit control information to an eNodeB. The UE may also be assigned resource blocks 420*a*, 420*b* in the data section to transmit data to the eNodeB. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. An uplink transmission may span both slots of a subframe and may hop across frequency.

A set of resource blocks may be used to perform initial system access and achieve uplink synchronization in a physical random access channel (PRACH) 430. The PRACH 430 carries a random sequence and cannot carry any uplink data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
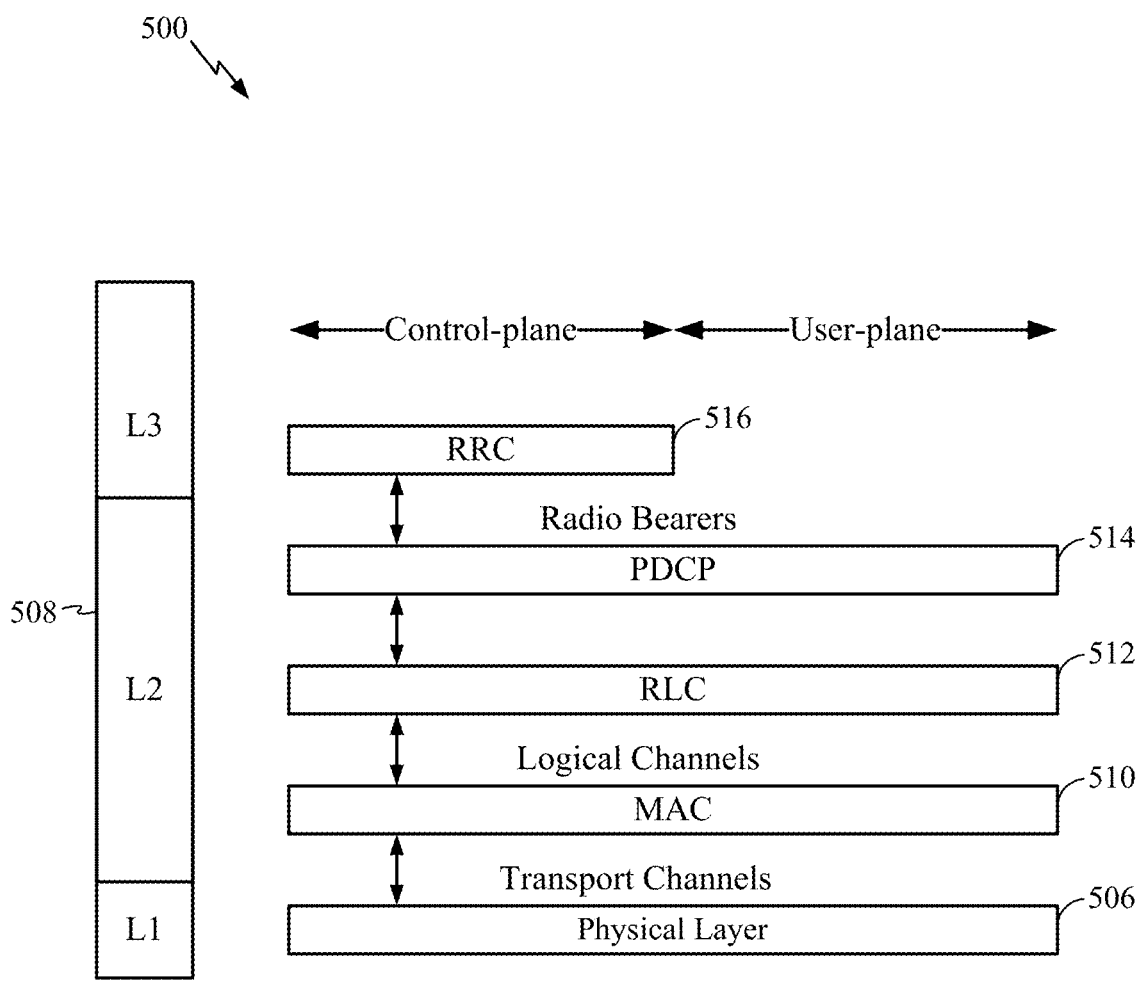
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNodeB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNodeB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNodeB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for the UEs between eNodeBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNodeB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNodeB and the UE.

Figure 6:
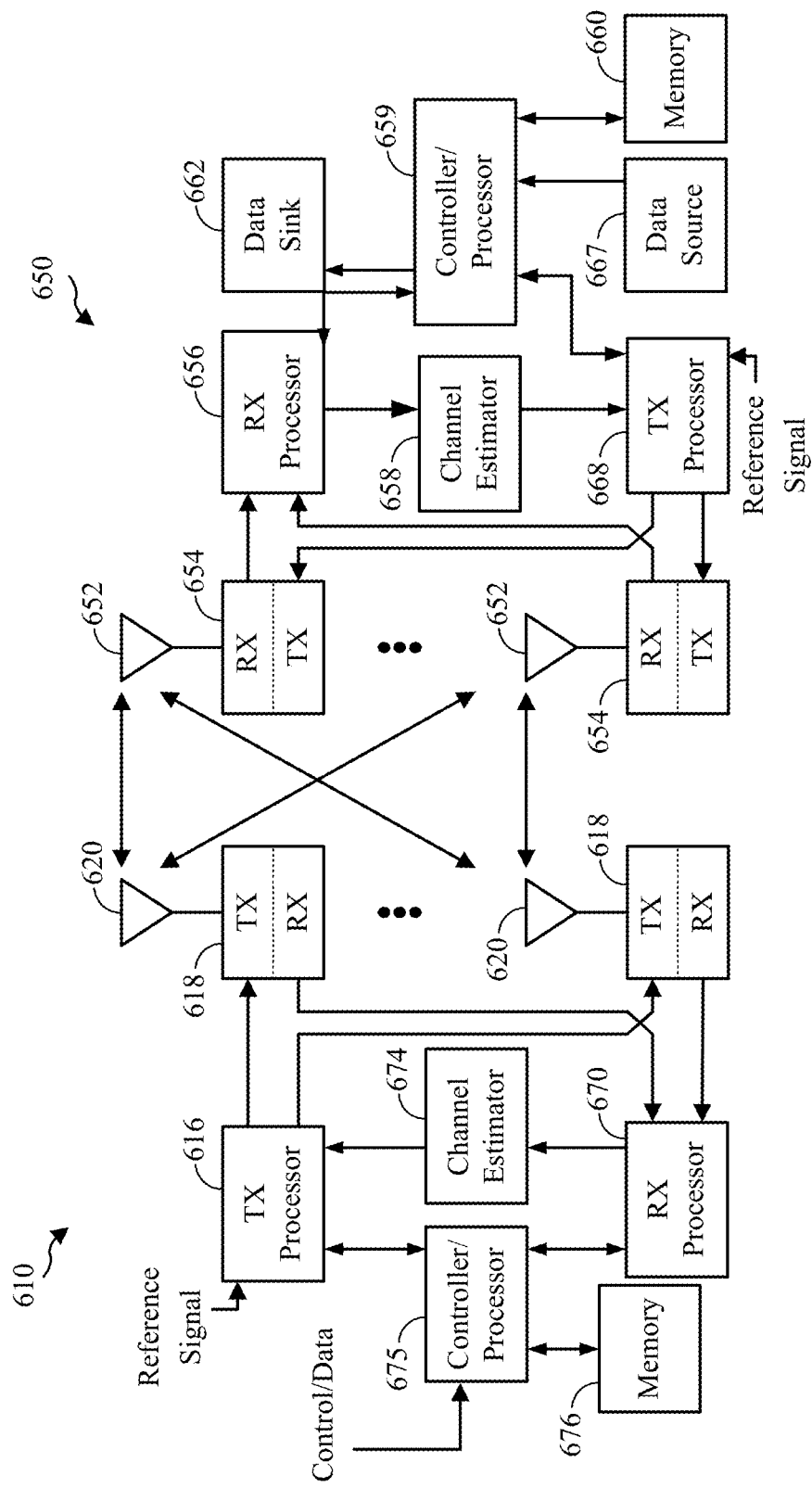
FIG. 6 is a diagram illustrating an example of an evolved Node B and user equipment in an access network.

FIG. 6 is a block diagram of an eNodeB 610 in communication with a UE 650 in an access network. In the downlink, upper layer packets from the core network are provided to a controller/processor 675. The controller/processor 675 implements the functionality of the L2 layer. In the downlink, the controller/processor 675 provides header compression, ciphering, packet segmentation and reordering, multiplexing between logical and transport channels, and radio resource allocations to the UE 650 based on various priority metrics.

The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNodeB 610. These soft decisions may be based on channel estimates computed by the channel estimator 658. The soft decisions are then decoded and deinterleaved to recover the data and control signals that were originally transmitted by the eNodeB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the uplink, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the uplink, a data source 667 is used to provide upper layer packets to the controller/processor 659. The data source 667 represents all protocol layers above the L2 layer. Similar to the functionality described in connection with the downlink transmission by the eNodeB 610, the controller/processor 659 implements the L2 layer for the user plane and the control plane by providing header compression, ciphering, packet segmentation and reordering, and multiplexing between logical and transport channels based on radio resource allocations by the eNodeB 610. The controller/processor 659 is also responsible for HARQ operations, retransmission of lost packets, and signaling to the eNodeB 610.

Channel estimates derived by a channel estimator 658 from a reference signal or feedback transmitted by the eNodeB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The uplink transmission is processed at the eNodeB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the uplink, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

CSI-RS Configuration/Reporting Options for Comp

In LTE systems, communication between a UE and multiple eNodeBs may be coordinated in a coordinated multipoint transmission scheme (CoMP). CoMP schemes may include coordinated scheduling and coordinated beam forming (CS/CB), dynamic point selection (DPS) and joint transmission (JT) schemes. Joint transmission schemes may be coherent or non-coherent. Homogeneous CoMP schemes may coordinate eNodeBs across cells of the same macro site or across three neighboring macro sites. For example, heterogeneous CoMP schemes may coordinate eNodeBs across a macro cell and its pico cells (including remote radio heads (RRHs)) in which the macro cells and the remote radio heads may be configured with the same cell IDs or different cell IDs. The use of the same cell ID for the macro cells and the remote radio heads in a heterogeneous CoMP scheme reduces dependency on physical cell IDs.

Typically, channel state information reference signals (CSI-RS) are used for channel measurement. LTE Release 10 supports non-zero power (NZP) and zero power (ZP) CSI-RS. The non-zero power CSI-RS includes reference signals and may be used for channel measurement. The zero power CSI-RS are muted tones that may be specified for muting non-zero power patterns corresponding to neighboring cells. These muted non-zero power patterns may be used for channel measurements and/or interference measurements at the serving cell.

In LTE Release 11, CoMP schemes may include specifications for the CSI-RS to include channel measurements for more than one transmission point. Such schemes support more than one non-zero power CSI-RS resource for CSI-RS based power measurement and may use additional zero power CSI-RS resources for improved muting. Interference measurements in CoMP schemes may be based on a revised zero power CSI-RS and non-zero power CSI-RS resource configuration.

In some cases, CSI-RS resources may be used for either CSI feedback (e.g., RI/PMI/CQI reporting) or CSI-RS based reference signal received power (RSRP) reporting. Specifically, a particular CSI-RS resource may correspond to one instance of CSI-RSRP reporting and/or CSI feedback. Additionally, expanding the use of CSI-RS resources beyond transmission points or cells may enable new forms of feedback, such as aggregated feedback.

Certain non-zero power CSI-RS resources may be defined based on a combination of an antenna ports count (antennaPortsCount), a resource configuration (resourceConfig), and a subframe configuration (subframeConfig). The antenna ports count is the number of ports that can be configured independently per CSI-RS resource. Therefore, the CSI resources may not have the same number of antenna ports. The resource configuration specifies a pattern of a CSI-RS to be used by tones or resource elements (REs). The RE patterns may be configured independently. The subframe configuration specifies a periodicity and subframe offset for CSI-RS transmissions. The periodicity and subframe offset may be configured independently or jointly. The aforementioned parameters may include sub-parameters to indicate how the CSI-RS is to be transmitted.

In LTE Release 10, the CSI-RS scrambling sequence initialization is based on a physical cell ID. Alternatively, in LTE Release 11, a virtual cell ID may be used for the scrambling sequence instead of the physical cell ID. That is, in LTE Release 11, the CSI-RS scrambling sequence initialization may be based on a virtual cell ID. The virtual cell ID is configurable for each CSI-RS resource via the radio resource control (RRC) sub-layer.

LTE Release 11 may also support CSI-RS based received power measurement(s) and feedback, such as CSI-RSRP. The CSI-RSRP may be used to perform CoMP set management. Furthermore, a UE may periodically perform the CSI-RSRP measurements and report the received power measurements. A subset of measured resources may be configured for actual CSI feedback, such as rank indication (RI), precoding matrix information (PMI) and channel quality indication (CQI) reports. In one configuration, the CSI-RSRP may be reported for approximately four to eight CSI-RS resources.

In some cases, a UE may perform RI/PMI/CQI feedback for multiple CSI-RS resources. That is, the RI/PMI/CQI feedback may be based on the CSI-RSRP measurements and CSI measurements. The CSI reporting may be performed for approximately two or three CSI-RS resources. In one configuration, to reduce computational complexity, CSI may be performed for only two CSI-RS resources.

Additionally, to improve the signal to interference and noise ratio (SINR) for CSI and/or CSI-RSRP measurement, zero power CSI-RS configurations may be specified to facilitate muting by neighboring cells. The number of zero power CSI-RS configurations may depend on whether the zero power CSI-RS is used only for CSI feedback or for both CSI and CSI-RSRP measurement.

CSI feedback may be either periodic or aperiodic. Aperiodic feedback is performed on a per-request basis and may be triggered by the network through a grant on a control channel, such as the physical downlink control channel (PDCCH). Reporting of aperiodic feedback may be performed on a shared uplink channel, such as the physical uplink shared channel (PUSCH). The aperiodic feedback may support higher payload transmissions. Various reporting modes are defined based on different performance/overhead tradeoffs.

For periodic feedback, various reporting modes are also defined. Periodic CSI feedback follows a specific timeline that is configured semi-statically. Furthermore, the periodic feedback may have a limited payload because the periodic CSI feedback is transmitted on an uplink control channel, such as the PUCCH.

According to aspects of the present disclosure, different CSI-RS configuration types may be defined. A first CSI-RS configuration type includes CSI-RS resources for CSI-RSRP measurement. A second CSI-RS configuration type includes CSI-RS resources for CSI feedback. The second CSI-RS configuration type may be further differentiated into CSI-RS resources for channel measurement and CSI-RS resources for interference measurement. A third CSI-RS configuration type includes zero-power CSI-RS resources. The zero power CSI-RS resources in the third CSI-RS configuration type may be specified for muting to improve measurement in neighboring cells and for interference measurement.

According to an aspect of the present disclosure, the parameters of the first CSI-RS configuration type may include a number of antenna ports (e.g., antennaPortsCount), a resource pattern (e.g., resourceConfig), a periodicity/offset for the CSI-RS transmissions (e.g., subframeConfig), and a virtual cell ID (e.g., parameter X). The number of CSI-RS resources configured for the first CSI-RS configuration type is referred to as $K_1$.

According to another aspect of the present disclosure, the parameters of the second CSI-RS configuration type are the same as the parameters of the first CSI-RS configuration type. The number of CSI-RS resources configured for the second CSI-RS configuration type is referred to as $K_2$. In one configuration, the number of CSI-RS resources allocated for CSI-RSRP measurements is greater than the number of CSI-RS resources allocated for CSI feedback. Accordingly, in this configuration, $K_1$ is greater than or equal to $K_2$.

According to yet another aspect of the present disclosure, the third CSI-RS configuration type may include two alternatives. For the first alternative, parameters of the third CSI-RS configuration type include a single periodicity/offset and a combination of four port patterns that may be muted. For the second alternative, parameters of the third CSI-RS configuration type include multiple periodicity/offsets and/or allow muting patters with less than four ports. The number of CSI-RS resources that are muted for the third CSI-RS configuration type is referred to as $K_3$.

As discussed above, in one configuration, the number of CSI-RS resources allocated for CSI-RSRP measurements is greater than the number of CSI-RS resources allocated for CSI feedback. Accordingly, in this configuration, $K_1$ is greater than or equal to $K_2$. Furthermore, in another configuration, the number of CSI-RS resources configured for CSI feedback is greater than or equal to a number of CSI-RS resources configured as zero power CSI-RS (i.e., $K_1$ is greater than or equal to $K_2$, and $K_2$ is greater than or equal to $K_3$). In the present configuration, muting may be only performed for CSI feedback and not for CSI-RS based CSI-RSRP measurement.

In another configuration, the number of CSI-RS resources allocated for CSI-RSRP measurements is greater than the number of CSI-RS resources allocated for zero power CSI-RS. Furthermore, the number of CSI-RS resources allocated for zero power CSI-RS may be greater than the number of CSI-RS resources configured for CSI feedback (i.e., $K_1$ is greater than or equal to $K_3$, and $K_3$ is greater than or equal to $K_2$). In the present configuration, muting may be performed for both CSI feedback and CSI-RS based CSI-RSRP reporting.

In some cases, non-zero power CSI-RS resources may overlap with zero power CSI-RS resources. That is, the non-zero power CSI-RS resources may be mapped to the same resource elements as the zero power CSI-RS resources. The overlap may be a full or partial overlap. In one configuration, an overlap of non-zero power CSI-RS resources with zero power CSI-RS resources may be resolved by specifying that non-zero power CSI-RS resources take priority over zero power CSI-RS resources.

Additionally, in some cases, the same CSI-RS pattern may be used for the different measurements (e.g., CSI-RSRP measurements and CSI feedback). That is, the first CSI-RS configuration type may overlap with the second CSI-RS configuration type to reduce the number transmitted CSI-RS reference signals (i.e., reuse CSI-RS transmissions for both CSI-RSRP and channel measurement). More specifically, the CSI-RS pattern transmitted to a UE may point to the same resources for the first CSI-RS configuration and the second CSI-RS configuration.

Figure 7:
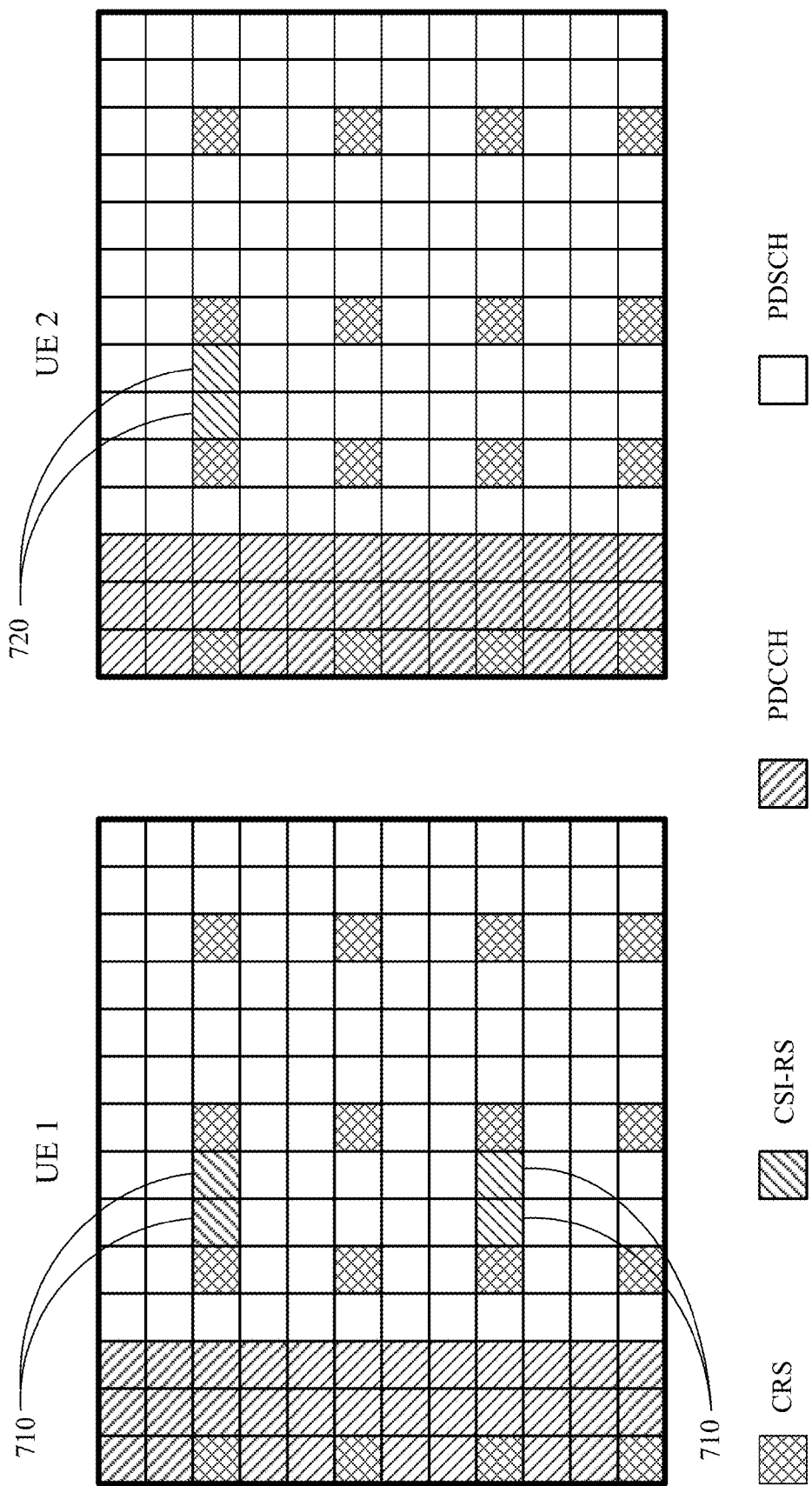
FIG. 7 is a diagram illustrating channel state information reference signals patterns in a downlink frame structure in a network according to aspects of the present disclosure.

For example, as shown in FIG. 7, a transmission point with four transmitters may transmit CSI-RS with four ports 710 for UEs that perform CSI feedback, such as UE 1. For the same transmission point, the UEs that measure CSI-RSRP for this point may be signaled via a two port pattern 720 that is a subset of the four port pattern 710 for the other UE. This is shown in FIG. 7, where the UE2 uses a subset (e.g., two port pattern 720) of the four port pattern 710 for CSI-RSRP measurement. Without an overlap between the first CSI-RS configuration type and the second CSI-RS configuration type, the overhead increases because the eNodeB provides a separate two port pattern for the UE2. Reuse of CSI-RS transmissions across the first CSI-RS configuration type and the second CSI-RS configuration type may occur in only some subframes if the first CSI-RS configuration type and the second CSI-RS configuration type are configured with different periodicities. This may be the case if CSI-RSRP and CSI measurements are configured to be based on different periodicities.

As another example, a single UE may receive a four port configuration for CSI feedback and a two port configuration for CSI-RSRP measurements. In this example, the two port configuration overlaps with the four port configuration. Accordingly, in the case of an overlap, the UE may select the ports to use for the CSI-RSRP measurement and the ports to use for the CSI feedback based on various selection criteria.

When the CSI-RS patterns overlap, conflicts may also occur due to different cell IDs specified for the overlapping patterns in the first CSI-RS configuration type and the second CSI-RS configuration type. These overlaps may not be considered as errors from the UE perspective. For example, if the overlapping patterns are consistent, a UE may independently follow the first CSI-RS configuration type for CSI-RSRP reporting and follow the second CSI-RS configuration type for CSI reporting.

According to an aspect of the present disclosure, various options may be specified if the overlapping patterns in the first CSI-RS configuration type and the second CSI-RS configuration type specify different cell IDs. In a first option, one of the overlapping patterns is chosen based on a specified priority, where the priority may be predetermined. For example, the configuration for CSI feedback may have priority over the configuration for CSI-RSRP measurements.

In a second option, overlapping patterns may be ignored and a non-overlapping pattern may be selected. That is, the second option disregards the overlapping of the CSI-RS configuration. In a third option, the conflicting overlapping patterns are considered to be an error condition (e.g., RRC configuration error), and the entire CSI-RS configuration is disregarded. In the second and third options, the network is specified to mitigate the error condition. In a fourth option, the overlapping patterns may not be treated as an error case. Instead, the UE may separately carry out CSI-RSRP and/or CSI measurements in line with configured CSI-RS configurations. This UE behavior may correspond to the case in which the network transmits all of the overlapping CSI-RS configurations on the same resource elements as colliding reference signals.

According to another configuration, the CSI-RS based CSI-RSRP may be reported using a number of different reporting schemes. In a first CSI-RSRP reporting scheme, the reporting is triggered at a UE based on event criteria configured by the eNodeB. In a second CSI-RSRP reporting scheme, the reporting is triggered by the UE based on aperiodic reporting via a grant requesting the aperiodic feedback. In a third configuration, the CSI-RSRP reporting is triggered based on periodic reporting and follows a reporting timeline configured by the eNodeB. Furthermore, cycling through points, the UE selection (M-best reporting), or a combination thereof may be used in combination with these three reporting schemes.

Typical CSI-RSRP values are encoded in seven bits which provides ninety seven different possible CSI-RSRP values. The CSI-RS based CSI-RSRP may not use all of the different possible CSI-RSRP values when the UE is only interested in determining the strongest points. Thus, according to one configuration, the CSI-RS based CSI-RSRP is encoded differentially based on the strongest cell. Reporting may saturate for points that are below a threshold compared to the serving cell. The differential reporting can be based on one absolute CSI-RS based CSI-RSRP report. Alternatively, the reference point may be the CRS based RSRP report of the serving cell.

In another configuration, CSI-RS is used for CSI-RSRP measurement for CoMP set management or for radio resource management (RRM) where there are limited configuration options for the CSI-RS periodicity (e.g., the shortest periodicity of CSI-RS is 5 milliseconds (ms)). The CSI-RS may have a variable offset, that is, the CSI-RS may be placed in any desired subframe. Still, the minimum periodicity for two CSI-RS' of the same configuration is 5 ms.

Configuring a DRX on-duration of equal to or greater than 5 ms to wait for a CSI-RS before measuring a CSI-RS port may lead to less efficient battery power usage. Such inefficiency is increased for the UEs that are configured to use CSI-RS for various purposes, because such delays would occur more frequently. In one aspect, a burst of CSI-RS in a short time period is provided. The burst may be followed by a long pause and then followed by another burst of CSI-RS. The burst of CSI-RS may occur when the UE is on during a DRX cycle. In another configuration, a burst of CSI-RS is received in a short time period while a single CSI-RS is periodically transmitted between the bursts of CSI-RS.

Figure 8A:
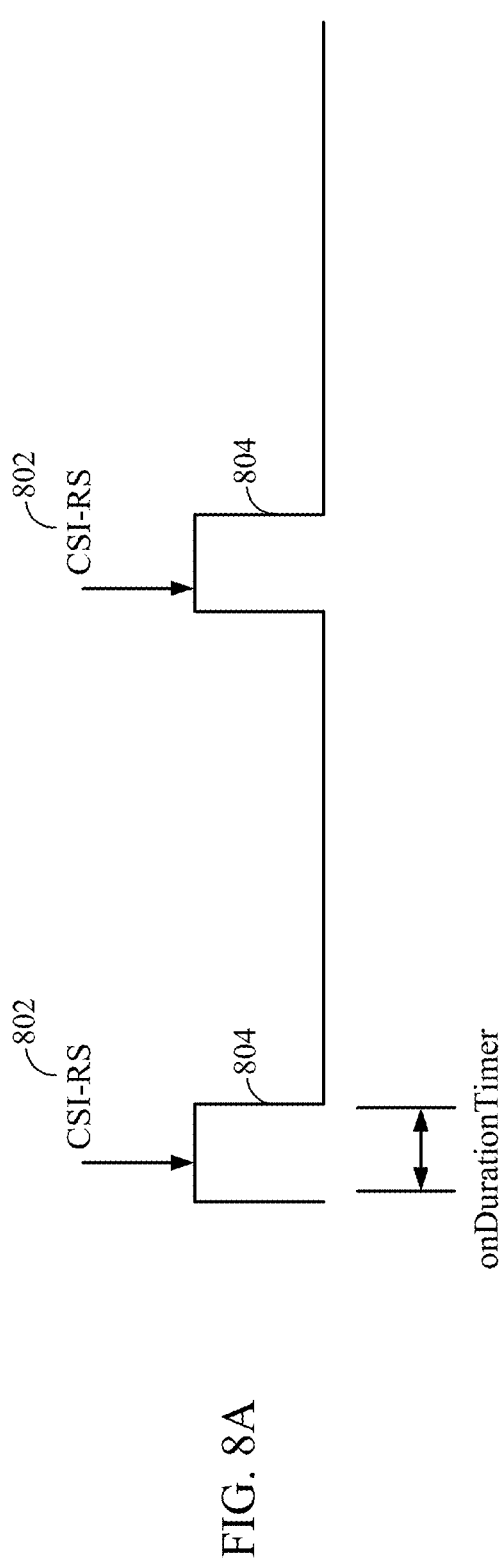
Figure 8B:
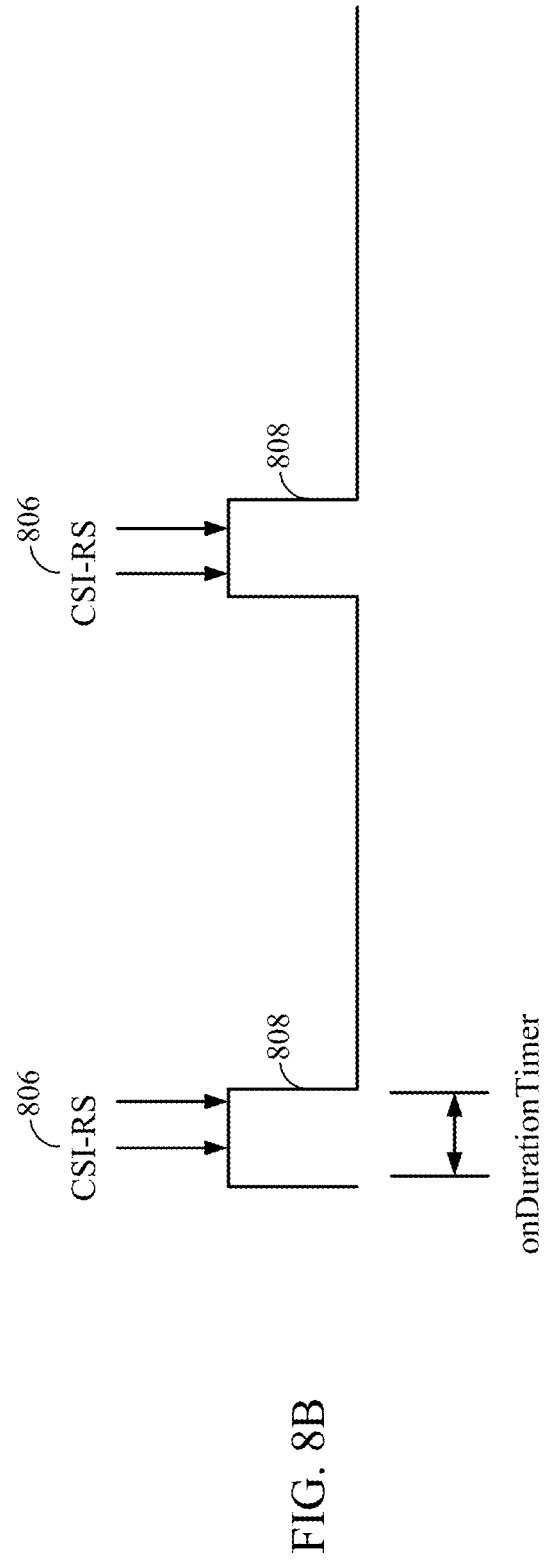

FIG. 8A illustrates a typical CSI-RS configuration with one period. As shown in FIG. 8A, one CSI-RS measurement 802 is performed in each of the short DRX cycle at times 804. According to one configuration, as shown in FIG. 8B, a group of densely located CSI-RSs 806 are configured. The CSI-RS are configured within the on-duration 808 of 5 ms and with larger periodicity between groups, rather than configuring CSI-RS with fixed periodicity. For example, a periodicity of 40 ms between groups may be configured to match a short or long DRX cycle. According to one aspect of the disclosure, the group 806 may consist of one type of CSI-RS. In another aspect of the disclosure, the group 806 may consist of multiple types of CSI-RS, such as CSI-RS for CSI-RSRP, CSI-RS for CSI feedback, CSI-RS for CoMP set management, or CSI-RS for interference management. The CSI-RS is configured such that when the UE wakes up during the on-duration period, the UE may obtain the measurements before becoming inactive for the next DRX sleep period.

According to another aspect of the present disclosure, as shown in FIG. 8C, a group of densely located CSI-RSs 810 are configured. That is, the CSI-RSs 810 may be configured within the on-duration 812 of 5 ms. Also, CSI-RSs 814 are periodically provided in symbols between groups 810. For example, a periodicity of 40 ms between groups 810 may be configured to match a short or long DRX cycle. In this configuration, a single CSI-RS 814 is also configured to repeat periodically between the groups 810. For example, the single CSI-RS 814 may be configured with a periodicity of 10 ms, between to the groups of densely located CSI-RSs 810 configured with a periodicity of 40 ms.

According to another aspect of the present disclosure, a larger control channel section is configured during the DRX on periods. For example, according to this configuration, an allocation size of an enhanced control channel, such as an ePDCCH, is subframe dependent and is increased during the DRX-ON periods. The larger control section enables many UEs that are in the same DRX-ON period to be woken up, which may provide for a more efficient schedule.

In another aspect, when the ePDCCH region is radio resource control (RRC) configured, the RRC may specify the configuration of different ePDCCH regions for different subframes. In yet another configuration, the configuration of the ePDCCH regions is dynamically signaled. For example, the configuration of the ePDCCH regions may be signaled by introducing an extended physical control format indicator channel (ePCFICH). Signaling on the ePCFICH allows the ePDCCH region to change on a subframe basis or on a group of subframe basis.

Figure 9:
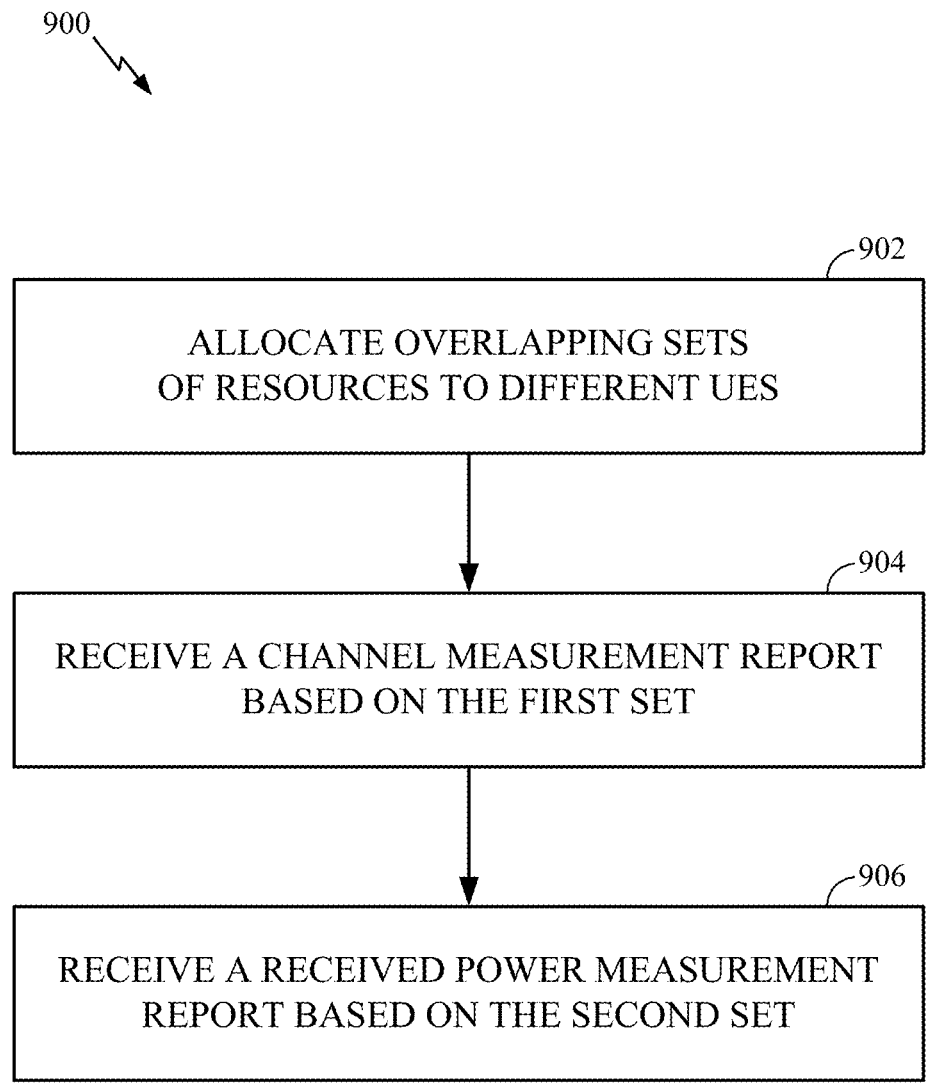
FIG. 9 is a block diagram illustrating a method for configuring channel state information reference signals according to an aspect of the present disclosure.

FIG. 9 illustrates a method 900 for wireless communication. In block 902, a base station allocates overlapping sets of resources to different UEs. The overlapping resources include at least a first set of resources and a second set of resources. The first set of resources are allocated to a first UE for a channel measurement, such as CSI feedback. The second set of resources are allocated to a second UE for received power measurements, such as CSI-RSRP measurements. As noted above, the UE may be signaled with a third CSI-RS configuration type corresponding to zero-power CSI-RS resources. The zero power CSI-RS resources in the third CSI-RS configuration type may be muted to improve measurement in neighboring cells and for interference measurement at the serving cell.

The base station receives a CSI report based at least in part on the first set of resources in block 904. The CSI report can be based on, for example, a CSI-RS generated specifically for CSI reporting. Furthermore, the base station receives a received power measurement report based at least in part on the second set of resources in block 906. The power measurement report can be based on, for example, a CSI-RS generated specifically for power measurement reports. The reception of the CSI report and received power measurement report is in response to the base station transmitting the allocation of the first set of resources and the second set of resources to the respective UEs.

In one configuration, the eNodeB 610 is configured for wireless communication including means for allocating. In one configuration, the allocating means may be the controller/processor 675, transmit processor 616, and/or memory 676 configured to perform the functions recited by the allocating means. The eNodeB 610 is also configured to include a means for receiving. In one configuration, the receiving means may be the receive processor 670, demodulators 618, controller/processor 675, and/or antenna 620 configured to perform the functions recited by the receiving means. In another configuration, the aforementioned means may be any module or any apparatus configured to perform the functions recited by the aforementioned means.

In yet another configuration, the UE 650 is configured for wireless communication including means for receiving. In one aspect, the receiving means may be the controller/processor 659, memory 660, receive processor 656, modulators 654, and/or antenna 652 configured to perform the functions recited by the receiving means.

Figure 10:
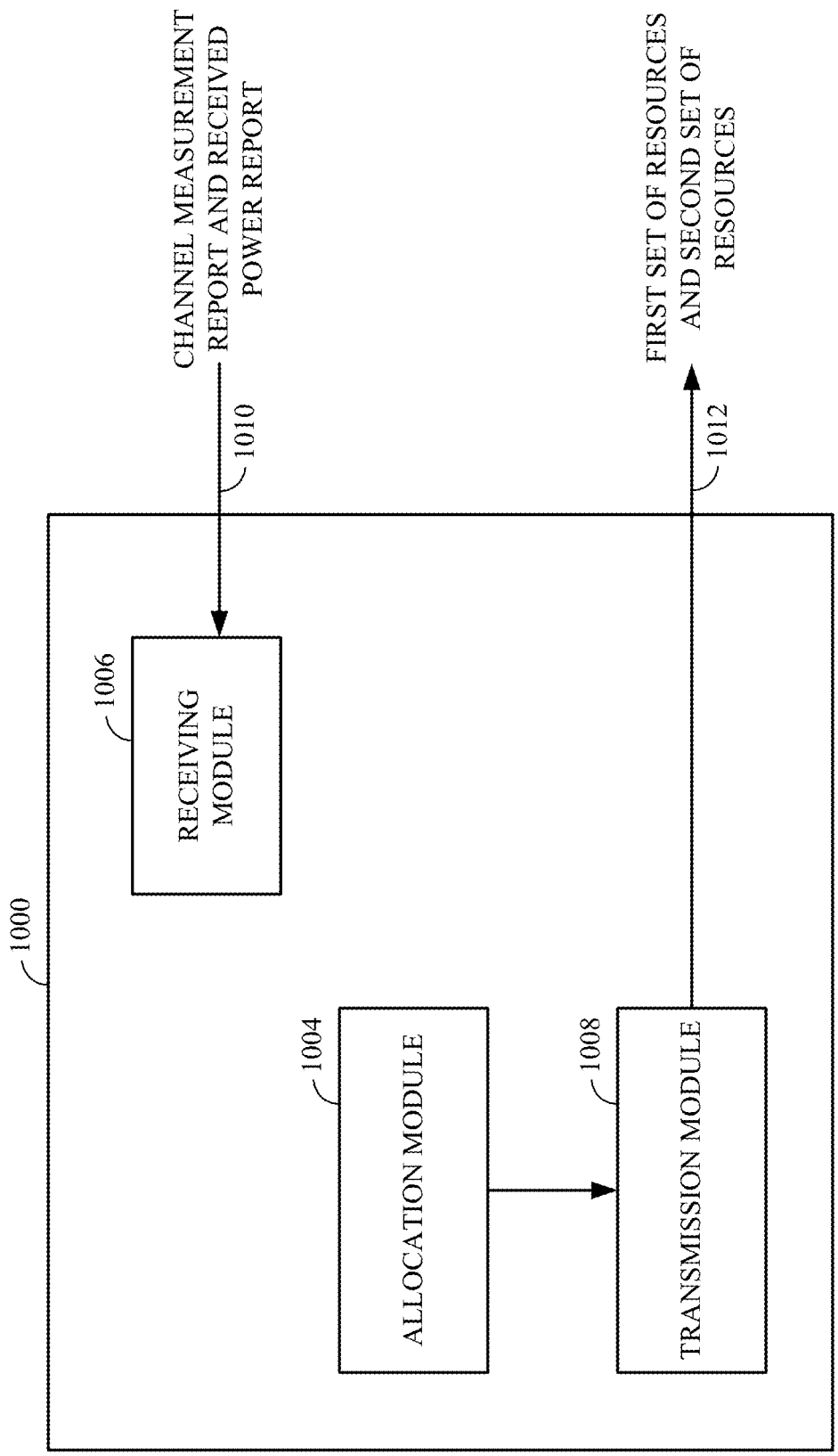
FIG. 10 is a conceptual data flow diagram illustrating the data flow between different modules/means/components in an exemplary apparatus.

FIG. 10 is a conceptual data flow diagram illustrating the data flow between different modules/means/components in an exemplary apparatus 1000. The apparatus 1000 includes a receiving module 1006 that receives a CSI report based at least in part on the first set of resources. Furthermore, the receiving module 1006 receives a power measurement report based at least in part on the second set of resources.

The apparatus 1000 also includes an allocation module 1004 that allocates overlapping sets of resources to different UEs. The overlapping resources including at least a first set of resources and a second set of resources. The first set of resources are allocated to a first UE for a channel measurement, such as CSI feedback. The second set of resources are allocated to a second UE for received power measurements, such as CSI-RSRP measurements.

The allocation module transmits the allocation of the first set of resources and the second set of resources to the transmission module 1008. The transmission module 1008 may transmit the first set of resources and the second set of resources to respective UEs via a signal 1012. The receiving module 1006 receives the CSI report and the received power measurements in response to the first set of resources and the second set of resources transmitted from the transmission module 1008. The CSI report and the received power measurements may be received via a signal 1010. The CSI report may be referred to as a channel measurement report. The apparatus may include additional modules that perform each of the steps of the process in the aforementioned flowchart of FIG. 9. As such, each step in the aforementioned flowchart FIG. 9 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

In another configuration, the exemplary apparatus 1000 includes only the receiving module 1006, configured to receive one or more non-grouped CSI-RS with a first periodicity and to receive grouped CSI-RS in bursts, the burst having a second periodicity.

Figure 11:
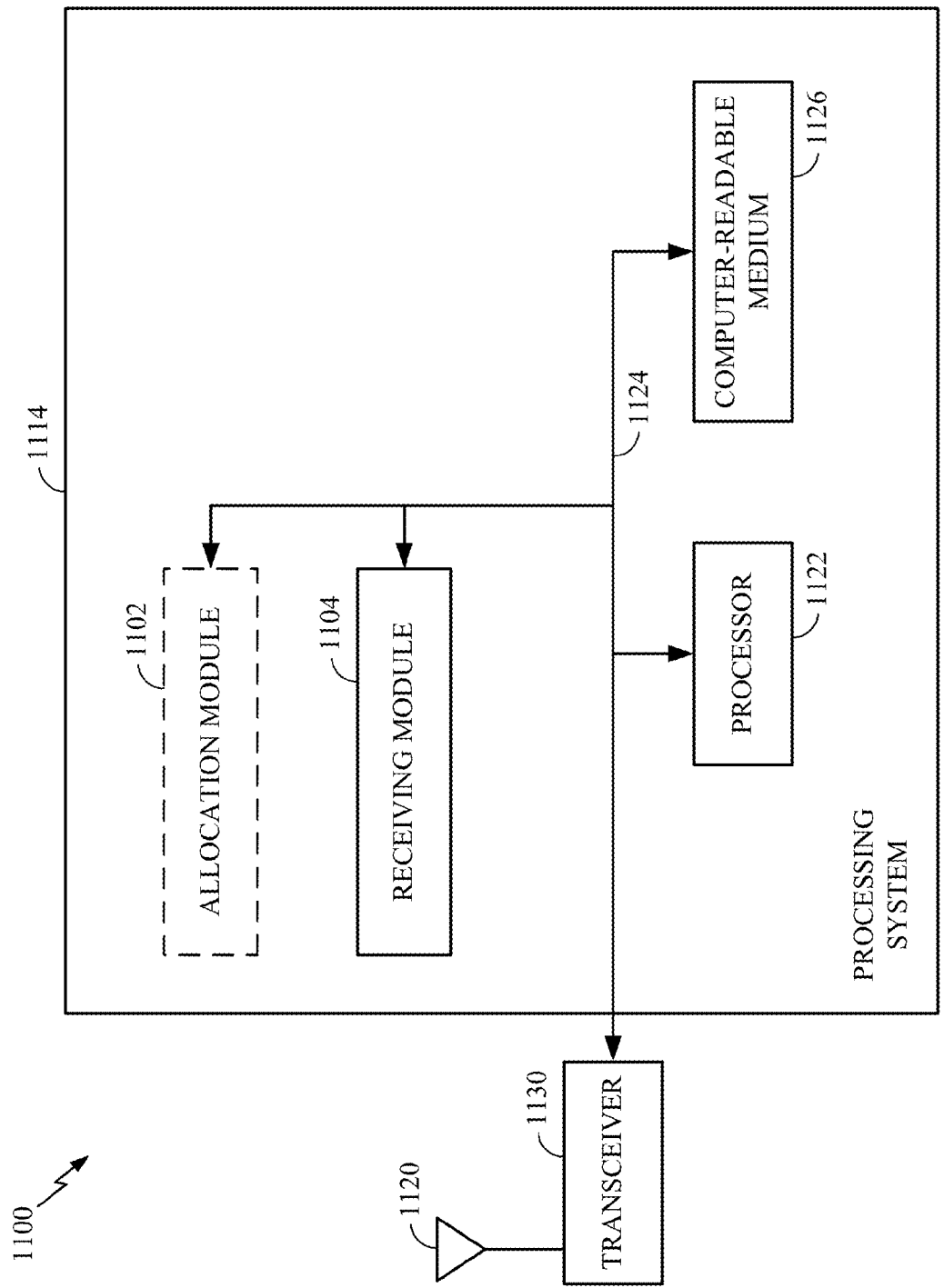
FIG. 11 is a block diagram illustrating different modules/means/components in an exemplary apparatus.

FIG. 11 is a diagram illustrating an example of a hardware implementation for an apparatus 1100 employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware modules, represented by the processor 1122 the modules 1102, 1104, and the computer-readable medium 1126. The bus 1124 may also link various other circuits such as timing sources, peripherals, voltage regulators, and power management circuits, which are well known in the art, and therefore, will not be described any further.

The apparatus includes a processing system 1114 coupled to a transceiver 1130. The transceiver 1130 is coupled to one or more antennas 1120. The transceiver 1130 enables communicating with various other apparatus over a transmission medium. The processing system 1114 includes a processor 1122 coupled to a computer-readable medium 1126. The processor 1122 is responsible for general processing, including the execution of software stored on the computer-readable medium 1126. The software, when executed by the processor 1122, causes the processing system 1114 to perform the various functions described for any particular apparatus. The computer-readable medium 1126 may also be used for storing data that is manipulated by the processor 1122 when executing software.

The processing system 1114 includes an allocation module 1102 for allocating overlapping sets of resources to different UEs. The processing system 1114 also includes a receiving module 1104 for receiving a CSI report based at least in part on the first set of resources. Furthermore, the receiving module 1104 receives a power measurement report based at least in part on the second set of resources The modules may be software modules running in the processor 1122, resident/stored in the computer-readable medium 1126, one or more hardware modules coupled to the processor 1122, or some combination thereof. In the present configuration, the processing system 1114 may be a component of the eNodeB 610 and may include the memory 676, and/or the controller/processor 659.

In another configuration, the receiving module 1104 of the processing system 1114 may be configured to receive one or more non-grouped CSI with a first periodicity, and to receive grouped CSI-RS in bursts, the burst having a second periodicity. In this configuration, the processing system 1114 does not include the allocation module 1102. When configured to received non-grouped CSI and grouped CSI, the processing system 1114 may be a component of the UE 650 and may include the memory 660, and/or the controller/processor 659.

Figure 12:
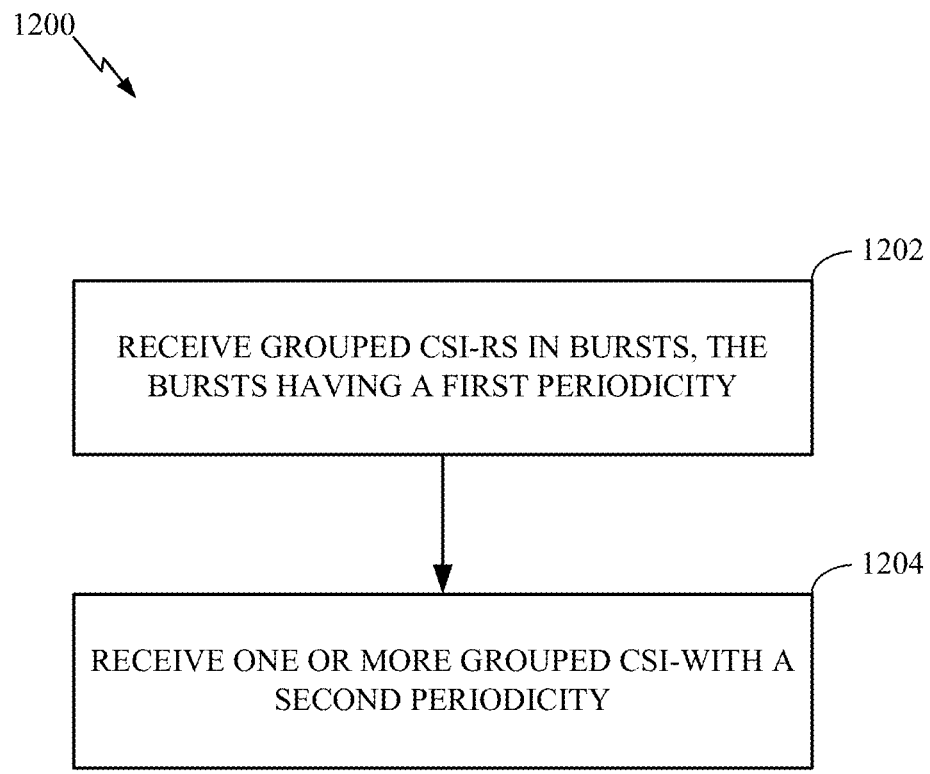
FIG. 12 is a block diagram illustrating a method for receiving configuring channel state information reference signals according to an aspect of the present disclosure.

FIG. 12 illustrates a method 1200 for wireless communication. In block 1202, the UE receives grouped CSI-RS in bursts, the burst having a first periodicity. Additionally, in block 1204, the UE receives one or more non-grouped CSI-RS with a second periodicity. That is, the non-grouped CSI-RS may be periodically provided in symbols between grouped CSI-RS. The first periodicity may be configured to match a short or long DRX cycle. In one configuration, the grouped CSI-RS may be configured within the DRX on-duration of 5 ms. For example, the first periodicity may be 40 ms to match a short or long DRX cycle. In this example, the non-grouped CSI-RS may be configured with a periodicity of 10 ms, between to the grouped CSI-RS configured with a periodicity of 40 ms.

Figure 13:
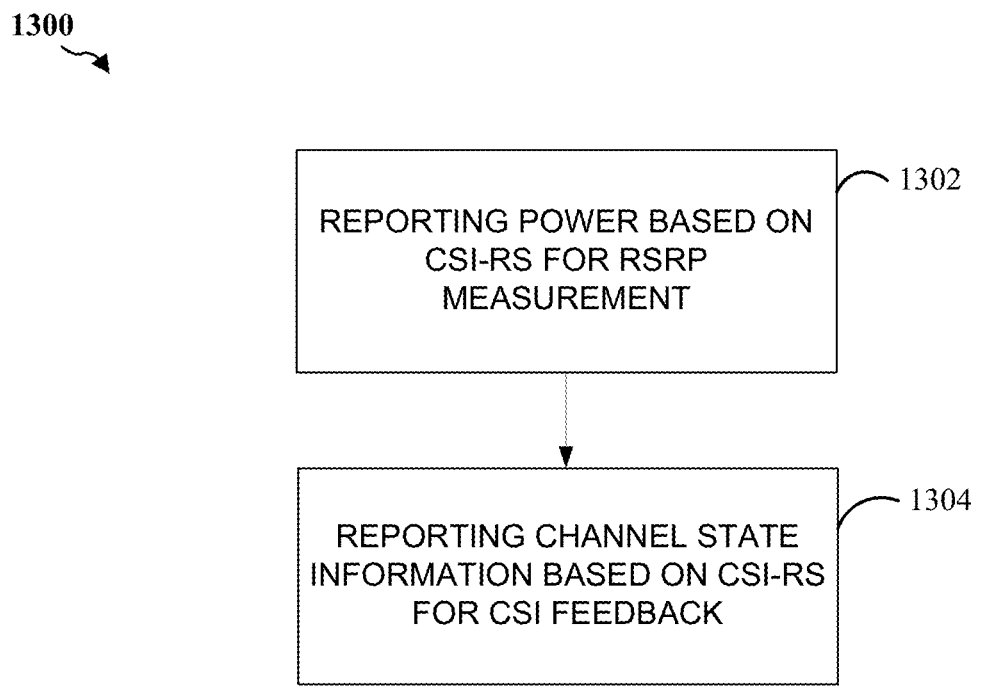
FIG. 13 is a block diagram illustrating a method for reporting channel state information reference signals resources according to aspects of the present disclosure.

FIG. 13 illustrates a method 1300 for reporting on different types of CSI-RS according to an aspect of the present disclosure. In block 1302, a UE provides power measurements based on a CSI-RS for reference signal receive power (RSRP) measurement. In block 1304, the UE reports channel state information based on a channel state information reference signal (CSI-RS) for CSI feedback. According to aspects of the present disclosure, the CSI-RS for RSRP measurement is allocated at least as many CSI-RS resources as the CSI-RS for CSI feedback.

In one configuration, the UE 650 is configured for wireless communication including means for reporting power measurements, and means for reporting channel state information. Referring to FIG. 6, in one configuration, the reporting means may be the controller/processor 659, TX processor 668, modulators 654, and/or antenna 652 configured to perform the functions recited by the reporting means. In yet another configuration, the aforementioned means may be any module or any apparatus configured to perform the functions recited by the aforementioned means.

Figure 14:
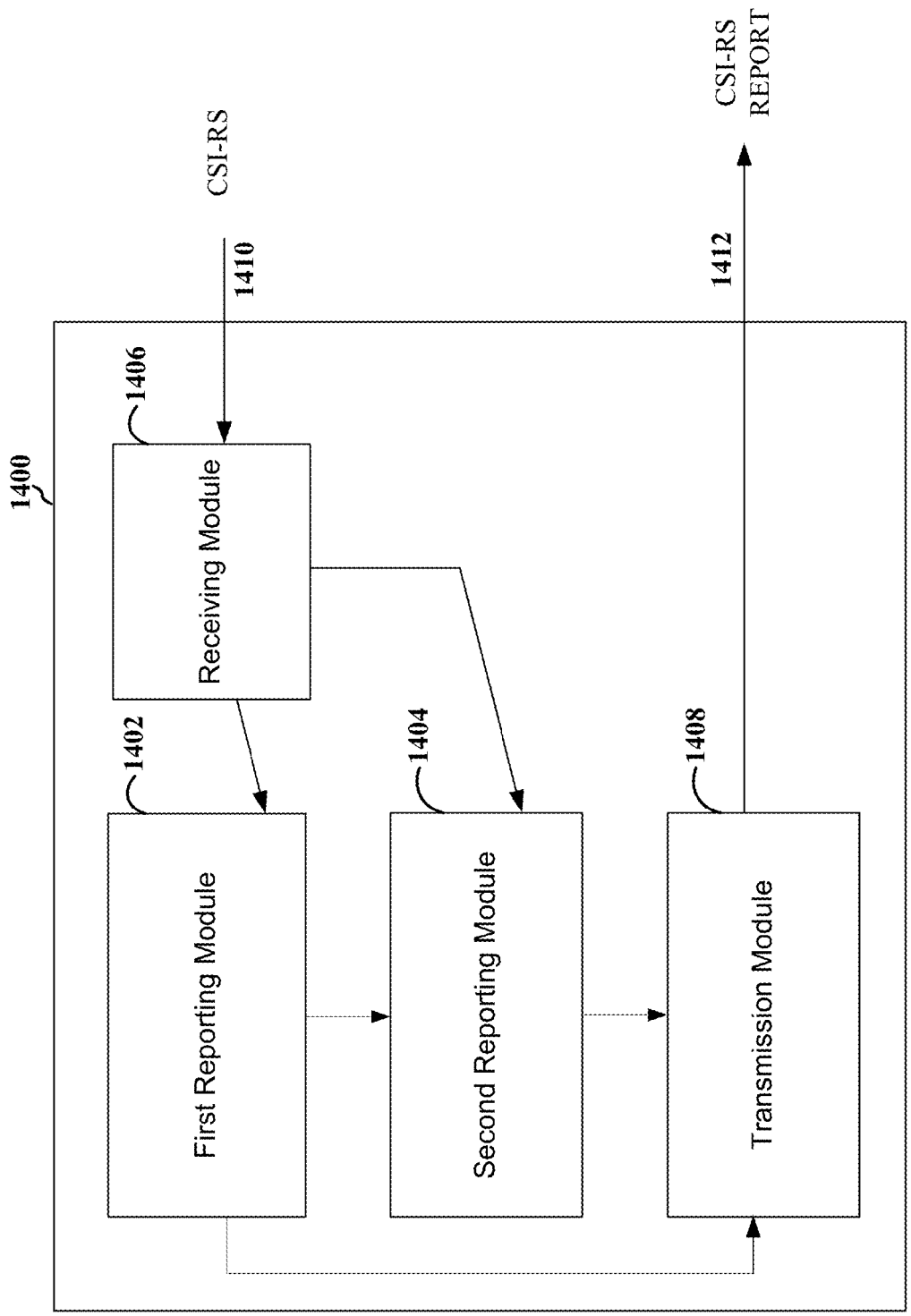
FIG. 14 is a conceptual data flow diagram illustrating the data flow between different modules/means/components in an exemplary apparatus.

FIG. 14 is a conceptual data flow diagram illustrating the data flow between different modules/means/components in an exemplary apparatus 1400. The apparatus 1400 includes a receiving module 1406 configured for receiving the CSI-RS. The CSI-RS may be received via a signal 1410. The apparatus 1400 also includes a first reporting module 1402 that reports a CSI-RS based receive power measurement. The receiving module 1406 may trigger the first reporting module 1402 to report the CSI-RS based receive power measurement based on the received CSI-RS. The apparatus 1400 also includes a second reporting module 1404 that reports channel state information. In one configuration, the receiving module 1406 may trigger the second reporting module 1404 to report the channel state information based on the received CSI-RS. In another configuration, the first reporting module 1402 may trigger the second reporting module 1404 to report the channel state information.

The apparatus 1400 also includes a transmitting module 1408 configured for transmitting the CSI-RS reports according to aspects of the present disclosure. The CSI-RS reports may include the channel state information received from the second reporting module 1404 and the CSI-RS based receive power measurement received from the first reporting module 1402. In one configuration, the transmitting module 1408 may receive both the channel state information and the CSI-RS based receive power measurement from the second reporting module 1404. The transmitting module 1408 may transmit the CSI-RS reports via a signal 1412.

The apparatus 1400 may include additional modules that perform each of the steps of the process in the aforementioned flowchart of FIG. 13. As such, each step in the aforementioned flowchart of FIG. 13 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 15:
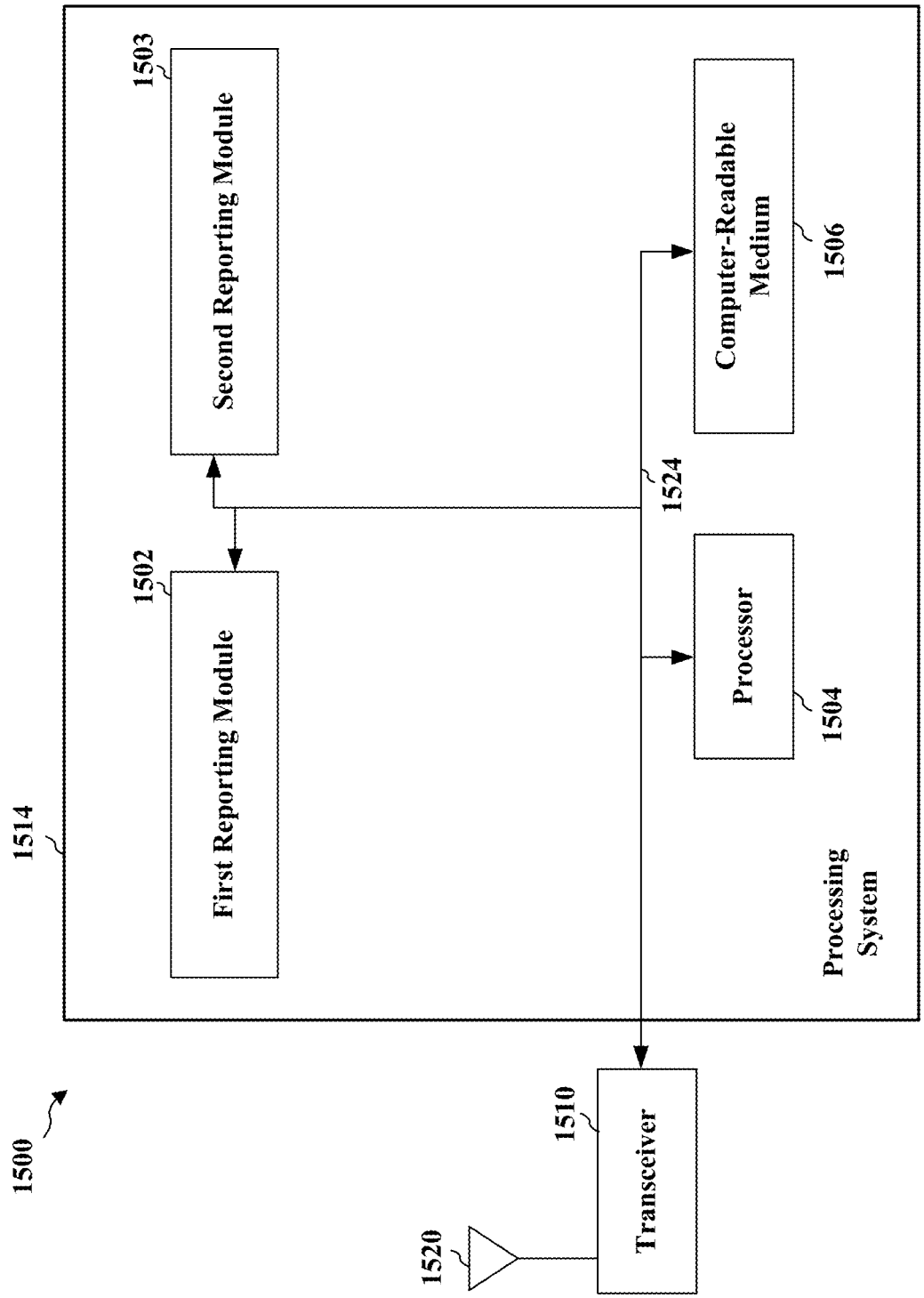
FIG. 15 is a block diagram illustrating different modules/means/components in an exemplary apparatus.

FIG. 15 is a diagram illustrating an example of a hardware implementation for an apparatus 1500 employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware modules, represented by the processor 1504 the modules 1502, 1503, and the computer-readable medium 1506. The bus 1524 may also link various other circuits such as timing sources, peripherals, voltage regulators, and power management circuits, which are well known in the art, and therefore, will not be described any further.

The apparatus includes a processing system 1514 coupled to a transceiver 1510. The transceiver 1510 is coupled to one or more antennas 1520. The transceiver 1510 enables communicating with various other apparatus over a transmission medium. The processing system 1514 includes a processor 1504 coupled to a computer-readable medium 1506. The processor 1504 is responsible for general processing, including the execution of software stored on the computer-readable medium 1506. The software, when executed by the processor 1504, causes the processing system 1514 to perform the various functions described for any particular apparatus. The computer-readable medium 1506 may also be used for storing data that is manipulated by the processor 1504 when executing software.

The processing system includes a first reporting module 1502 and a second reporting module 1503. The first reporting module 1502 can report a power measurement based on a first CSI-RS type. The second reporting module 1503 can report channel state information based on a second CSI-RS type. The modules may be software modules running in the processor 1504, resident/stored in the computer-readable medium 1506, one or more hardware modules coupled to the processor 1504, or some combination thereof. In one configuration, the processing system 1514 may be a component of the UE 650 and may include the memory 660, the transmit processor 668, the receive processor 656, the modulators/demodulators 654a-r, the antenna 652a-r, and/or the controller/processor 659.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
allocating overlapping sets of resources to different UEs, the overlapping resources including at least a first set of resources having a first configuration type and a second set of resources having a second configuration type, the first set of resources being allocated to a first UE and for channel state information (CSI) measurement, and the second set of resources being allocated to a second UE and for received power measurements, in which the first set of resources and the second set of resources have at least one resource in common, the first configuration type is different from the second configuration type, and each of the first configuration type and the second configuration type comprises at least a resource type, a resource pattern, and a transmission periodicity for the resource type;
receiving a channel state information report based at least in part on the first set of resources; and
receiving a first power measurement report based at least in part on the second set of resources.

2. The method of claim 1, in which a greater number of resources is allocated to the second set than to the first set.

3. The method of claim 1, further comprising:
   transmitting the allocation of the first set to the first UE; and
   transmitting the allocation of the second set to the second UE.

4. The method of claim 3, further comprising transmitting the allocation of the first set and the allocation of the second set to a third UE.

5. The method of claim 4, further comprising receiving a second power measurement report, a channel state information report, or a combination thereof from the third UE based at least in part on conflict resolution scheme of the third UE.

6. The method of claim 5, further comprising configuring at least the second power measurement report, the channel state information report, or the combination thereof to be triggered based at least in part on a grant, event criteria, or a reporting timeline.

7. The method of claim 5, in which at least the second power measurement report, the channel state information report, or the combination thereof is differentially reported, based at least in part on channel state information, a reference signal received power report, or a combination thereof.

8. An apparatus for wireless communications, comprising:
   a memory; and
   at least one processor coupled to the memory, the at least one processor being configured:
      to allocate overlapping sets of resources to different UEs, the overlapping resources including at least a first set of resources having a first configuration type and a second set of resources having a second configuration type, the first set of resources being allocated to a first UE for channel state information (CSI), and the second set of resources being allocated to a second UE for received power measurements, in which the first set of resources and the second set of resources have at least one resource in common, the first configuration type is different from the second configuration type, and each of the first configuration type and the second configuration type comprises at least a resource type, a resource pattern, and a transmission periodicity for the resource type;
      to receive a channel state information report based at least in part on the first set of resources; and
      to receive a first power measurement report based at least in part on the second set of resources.

9. The apparatus of claim 8, in which a greater number of resources is allocated to the second set than to the first set.

10. The apparatus of claim 8, in which the at least one processor is further configured:
    to transmit the allocation of the first set to the first UE; and
    to transmit the allocation of the second set to the second UE.

11. The apparatus of claim 10, in which the at least one processor is further configured to transmit the allocation of the first set and the allocation of the second set to a third UE.

12. The apparatus of claim 11, in which the at least one processor is further configured to receive at least a second power measurement report, a channel state information report, or a combination thereof from the third UE based at least in part on conflict resolution scheme of the third UE.

13. The apparatus of claim 12, in which the at least one processor is further configured to configure at least the second power measurement report, the channel state information report, or the combination thereof to be triggered based at least in part on a grant, event criteria, or a reporting timeline.

14. The apparatus of claim 12, in which at least the second power measurement report, the channel state information report, or the combination thereof is differentially reported based at least in part on channel state information, a reference signal received power report, or a combination thereof.

15. An apparatus for wireless communication, comprising:
    means for allocating overlapping sets of resources to different UEs, the overlapping resources including at least a first set of resources having a first configuration type and a second set of resources having a second configuration type, the first set of resources being allocated to a first UE for channel state information (CSI), and the second set of resources being allocated to a second UE for received power measurements, in which the first set of resources and the second set of resources have at least one resource in common, the first configuration type is different from the second configuration type, and each of the first configuration type and the second configuration type comprises at least a resource type, a resource pattern, and a transmission periodicity for the resource type;
    means for receiving a channel state information report based at least in part on the first set of resources; and
    means for receiving a first power measurement report based at least in part on the second set of resources.

16. A computer program product for wireless communications, the computer program product comprising:
    a non-transitory computer-readable medium having program code recorded thereon, the program code comprising:
       program code, executed by a processor, to allocate overlapping sets of resources to different UEs, the overlapping resources including at least a first set of resources having a first configuration type and a second set of resources having a second configuration type, the first set of resources being allocated to a first UE for channel state information (CSI), and the second set of resources being allocated to a second UE for received power measurements, in which the first set of resources and the second set of resources having at least one resource in common, the first configuration type is different from the second configuration type, and each of the first configuration type and the second configuration type comprises at least a resource type, a resource pattern, and a transmission periodicity for the resource type;
       program code to receive a channel state information report based at least in part on the first set of resources; and
       program code to receive a received first power measurement report based at least in part on the second set of resources.

17. The method of claim 1, in which the first configuration type comprises at least CSI-reference signal (RS) resources for CSI-reference signal received power (RSRP) measurements and the second configuration type comprises at least CSI-RS resources for feedback.

18. The method of claim 17, in which the first configuration type comprises zero power CSI-RS resources, non-zero power CSI-RS resources, or a combination thereof.

19. The method of claim 17, in which the second configuration type comprises zero power CSI-RS resources, non-zero power CSI-RS resources, or a combination thereof.

20. The method of claim 19, further comprising resolving a conflict between the zero power CSI-RS resources and the non-zero power CSI-RS resources by prioritizing the non-zero power CSI-RS resources over the zero power CSI-RS resources.

21. The apparatus of claim 8, in which the first configuration type comprises at least CSI-reference signal (RS) resources for CSI-reference signal received power (RSRP) measurements and the second configuration type comprises at least CSI-RS resources for feedback.

22. The apparatus of claim 15, in which the first configuration type comprises at least CSI-reference signal (RS) resources for CSI-reference signal received power (RSRP) measurements and the second configuration type comprises at least CSI-RS resources for feedback.

23. The computer program product of claim 16, in which the first configuration type comprises at least CSI-reference signal (RS) resources for CSI-reference signal received power (RSRP) measurements and the second configuration type comprises at least CSI-RS resources for feedback.

* * * * *